(12) United States Patent
Lopez

(10) Patent No.: US 7,175,321 B1
(45) Date of Patent: Feb. 13, 2007

(54) PROJECTOR SYSTEMS

(76) Inventor: Gustavo M. Lopez, 20543 W. Rainbow Trail, Buckeye, AZ (US) 85326

( * ) Notice: Subject to any disclaimer, the term of this patent is extended or adjusted under 35 U.S.C. 154(b) by 125 days.

(21) Appl. No.: 11/088,163

(22) Filed: Mar. 22, 2005

Related U.S. Application Data

(60) Provisional application No. 60/556,103, filed on Mar. 24, 2004.

(51) Int. Cl.
B60Q 1/00 (2006.01)

(52) U.S. Cl. .................. 362/496; 362/494; 362/504; 353/13; 40/560; 296/21

(58) Field of Classification Search ........ 362/493–494, 362/503–504, 496–497, 538, 540; 353/13, 353/122; 296/21; 428/31; 40/560
See application file for complete search history.

(56) References Cited

U.S. PATENT DOCUMENTS

| | | | |
|---|---|---|---|
| 4,779,176 A * | 10/1988 | Bornhorst | 353/62 |
| 5,548,274 A | 8/1996 | Anderson et al. | |
| 5,709,454 A * | 1/1998 | Hatlestad, II | 362/496 |
| 6,190,026 B1 * | 2/2001 | Moore | 362/487 |
| 6,213,627 B1 | 4/2001 | Albersfelder et al. | |
| 6,220,737 B1 | 4/2001 | Baragona | |
| 6,422,725 B1 | 7/2002 | Fong | |
| 6,616,312 B2 * | 9/2003 | Carter | 362/488 |
| 6,641,041 B2 | 11/2003 | Olds et al. | |
| 6,654,070 B1 * | 11/2003 | Rofe | 349/11 |
| 6,669,357 B2 | 12/2003 | Konicke et al. | |
| 6,685,347 B2 | 2/2004 | Grutze | |
| 6,697,721 B2 * | 2/2004 | Arlinsky | 701/36 |
| 6,733,134 B2 * | 5/2004 | Bleiner | 353/13 |
| 2002/0154349 A1 | 10/2002 | Halldorsson et al. | |
| 2003/0030554 A1 * | 2/2003 | Yavitz | 340/466 |
| 2003/0174505 A1 * | 9/2003 | Wainwright | 362/485 |
| 2003/0193651 A1 | 10/2003 | Egle | |

* cited by examiner

Primary Examiner—Renee Luebke
Assistant Examiner—Julie A. Shallenberger
(74) Attorney, Agent, or Firm—Stoneman Law Offices, Ltd.; Martin L. Stoneman

(57) ABSTRACT

A vehicle projection system relating to use of a light projecting system comprising at least one light projector adapted to project at least one decorative light design onto at least one exterior portion of a vehicle. The system preferably uses a laser projector and user-selectable controller to select and control decorative designs projected onto the vehicle exterior. The controller may be manually operated, computer programmed, remote controlled or utilize pre-selected programming.

19 Claims, 5 Drawing Sheets

PROJECTOR SYSTEMS

CROSS-REFERENCE TO RELATED APPLICATION

The present application is related to and claims priority from prior provisional application Ser. No. 60/556,103, filed Mar. 24, 2004, entitled "PROJECTOR SYSTEMS", the contents of which are incorporated herein by this reference and are not admitted to be prior art with respect to the present invention by the mention in this cross-reference section.

BACKGROUND

This invention relates to projector systems. More specifically, this invention relates to providing a system and method for projecting at least one decorative design (referring to any single line or combination of lines, points of light, images, patterns, indicia, logos, photographs, etc.) onto the exterior surface of a vehicle.

Presently, car enthusiasts and other vehicle owners spend a great deal of time and money trying to make their vehicles unique and stand out from others. It is very desirable for such vehicle owners to have new and unique ideas to customize their vehicles. The methods to do so include special bodywork, custom painting, custom rims, engine customizing and interior customizing. It would be highly useful and desirable to provide a unique method of customizing a vehicle exterior. Furthermore, it would be very useful to provide such a customizing feature that can be regularly and easily changed.

OBJECTS AND FEATURES OF THE INVENTION

A primary object and feature of the present invention is to provide a projector system for projecting at least one decorative design onto the exterior surface of a vehicle.

It is a further object and feature of the present invention to provide such a projector system that comprises user-selectable designs. It is another object and feature of the present invention to provide such a projector system that comprises easily changed designs.

It is a further object and feature of the present invention to provide such a projector system that comprises upgrades to user-selectable decorative design options.

It is a further object and feature of the present invention to provide such a projector system method for use.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a light projection system, relating to use on a vehicle, comprising, in combination: light projector means for projecting at least one decorative light design onto at least one exterior portion of the vehicle; attacher means for attaching such light projector means with the vehicle; power coupler means for coupling power with such light projector means; and geometric positioner means for assisting geometric positioning of such light projector means so that the at least one decorative light design is projectable onto the at least one exterior portion of the vehicle.

Moreover, it provides such a light projection system further comprising user-selector means for assisting at least one user-selection of the at least one projectable decorative light design. Additionally, it provides such a light projection system wherein such light projector means is operable to project the at least one user-selected decorative light design. Also, it provides such a light projection system wherein such light projector means comprises laser light means for projecting at least one laser decorative light design. In addition, it provides such a light projection system further comprising controller means for controlling such light projector means. And, it provides such a light projection system wherein: such controller means is electronically coupled to such light projector means; and such controller means comprises such user-selector means.

In accordance with another preferred embodiment hereof, this invention provides a light projection system, relating to use on a vehicle, comprising, in combination: at least one light projector adapted to project at least one decorative light design onto at least one exterior portion of the vehicle; at least one attacher adapted to attach such at least one light projector with the vehicle; at least one power coupler adapted to couple power with such at least one light projector; and at least one geometric positioner adapted to assist geometric positioning of such at least one light projector so that the at least one decorative light design is projectable onto the at least one exterior portion of the vehicle.

Further, it provides such a light projection system further comprising at least one user-selector structured and arranged to assist at least one user-selection of the at least one decorative light design to be projected.

Even further, it provides such a light projection system wherein such at least one light projector is operable to project the at least one user-selected decorative light design. Moreover, it provides such a light projection system wherein such at least one light projector comprises at least one laser light to project at least one laser decorative light design. Additionally, it provides such a light projection system further comprising at least one controller structured and arranged to control such at least one light projector.

Also, it provides such a light projection system wherein: such at least one controller is electronically coupled to such at least one light projector; and such at least one controller comprises such at least one user-selector. In addition, it provides such a light projection system wherein such at least one user-selector comprises at least one decorative light design storage adapted to store the at least one decorative light design.

And, it provides such a light projection system wherein such at least one decorative light design storage comprises: at least one programmer adapted to program the at least one decorative light design into such at least one storage; and at least one retriever adapted to retrieve the at least one decorative light design from such at least one storage; wherein the at least one decorative light design can be programmed, stored, retrieved and projected by such light projection system.

Further, it provides such a light projection system further comprising such vehicle. Even further, it provides such a light projection system wherein such vehicle comprises at least one usual vehicle component modified to house such at least one light projector.

In accordance with another preferred embodiment hereof, this invention provides a light projection system, relating to use on a vehicle, comprising, in combination: at least one such vehicle; at least one light projector adapted to project at least one decorative light design onto at least one exterior portion of the vehicle; at least one attacher adapted to attach such at least one light projector with the vehicle; at least one power coupler adapted to couple power with such at least one light projector; at least one geometric positioner adapted to assist geometric positioning of such at least one light projector so that the at least one decorative light design is projectable onto the at least one exterior portion of the vehicle; and at least one controller structured and arranged to control such at least one light projector; wherein such at least one controller comprises at least one user-selector structured and arranged to assist at least one user-selection of the at least one decorative light design to be projected; wherein such at least one user-selector comprises at least one decorative light design storage adapted to store the at least one decorative light design; wherein such at least one decorative light design storage comprises at least one programmer adapted to program the at least one decorative light design into such at least one storage; and at least one retriever adapted to retrieve the at least one decorative light design from such at least one storage; and wherein the at least one decorative light design can be programmed, stored, retrieved and projected by such light projection system.

In accordance with another preferred embodiment hereof, this invention provides a vehicle projection system relating to use of a light projecting system comprising at least one light projector adapted to project at least one decorative light design onto at least one exterior portion of the vehicle, at least one attacher adapted to attach such at least one light projector with the vehicle, at least one power coupler adapted to couple power with such at least one light projector, and at least one geometric positioner adapted to assist geometric positioning of such at least one light projector so that the at least one decorative light design is projectable onto the at least one exterior portion of the vehicle, such vehicle projection system comprising the steps of: selecting such at least one light projector; attaching and geometrically positioning such at least one light projector to such vehicle; electronically coupling such at least one light projector to a power source; and projecting such at least one decorative light design onto such at least one exterior portion of such vehicle. Even further, it provides such a vehicle projection system further comprising the step of modifying at least one existing vehicle component to house such at least one light projector.

DETAILED DESCRIPTION OF THE BEST MODES AND PREFERRED EMBODIMENTS OF THE INVENTION

Figure 1:
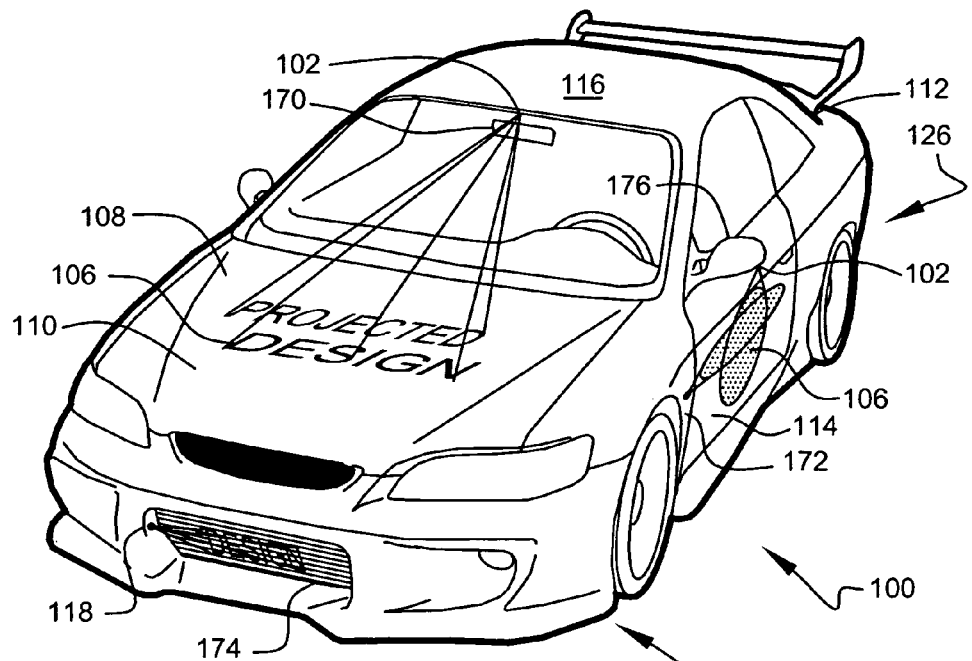
FIG. 1 shows a front perspective view of the projector system on a vehicle according to a preferred embodiment of the present invention.
Figure 2:
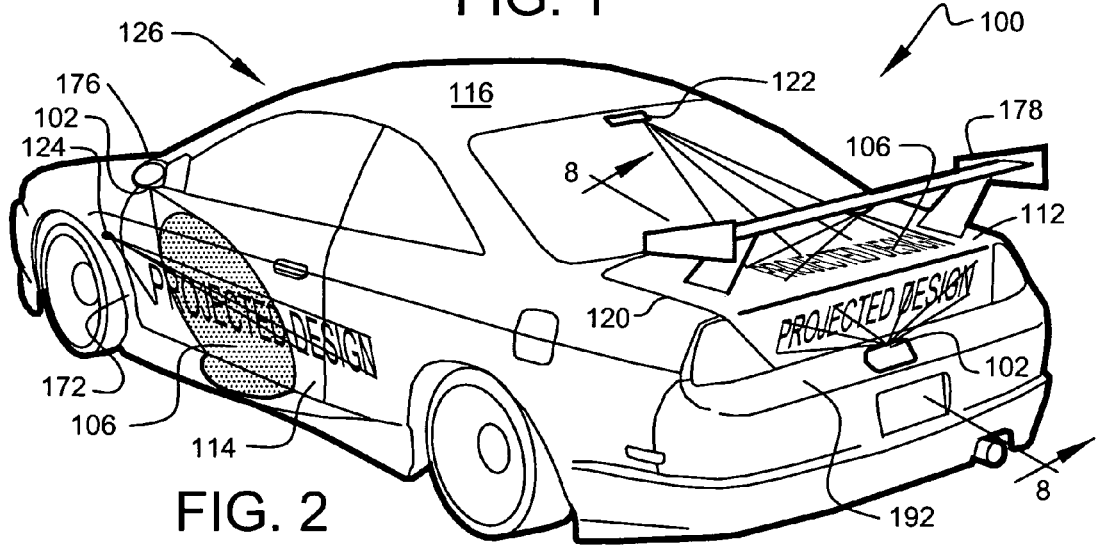
FIG. 2 shows a rear perspective view of the projector system on the vehicle of FIG. 1.

FIG. 1 shows a front perspective view of the projector system 100 on a vehicle 104 according to a preferred embodiment of the present invention. FIG. 2 shows a rear perspective view of the projector system 100 on the vehicle 104 of FIG. 1. Preferably, the projection system 100 comprises one or more projectors 102 that are preferably mounted onto a vehicle 104, as shown. Preferably, the projectors 102 are small and compact and will project a decorative design 106 onto the exterior portion 108 of the vehicle 104, as shown (at least embodying herein light projector means for projecting at least one decorative light design onto at least one exterior portion of the vehicle; and at least embodying herein at least one light projector adapted to project at least one decorative light design onto at least one exterior portion of the vehicle). Preferably, decorative design 106 refers herein to any single, combined, or arranged display of light utilizing lines, points of light, images, patterns, indicia, logos, photographs, etc., that create a distinctive arrangement of light (and not to general, diffuse illumination such as exterior light bulbs). Most preferably, decorative design 106 comprises any decorative design that can be light-projected from projector 102. Upon reading the teachings of this specification, those with ordinary skill in the art will now understand that, under appropriate circumstances, considering such issues as economics, user preference, available designs, advances in technology, etc., other light patterns, designs, logos, etc., such as circles, holograms, animated images, etc., may suffice. Further, upon reading the teachings of this specification, those with ordinary skill in the art will now understand that, under appropriate circumstances, considering such issues as projector preferences, economics, user preference, advances in technology, etc., other projectors, such as those using film to create a decorative projection, etc., may suffice.

Preferably, the projectors 102 are aimed and mounted to the proper geometric position to project the decorative design 106 onto a user-selected location of the vehicle 104 exterior such as, for example, the hood 110, trunk 112, vehicle side 114 (to include doors), top 116, front 118, etc., as shown (this arrangement at least embodies herein geometric positioner means for assisting geometric positioning of such light projector means so that the at least one decorative light design is projectable onto the at least one exterior portion of the vehicle; and at least embodies herein at least one geometric positioner adapted to assist geometric positioning of such at least one light projector so that the at least one decorative light design is projectable onto the at least one exterior portion of the vehicle). Most preferably, the projector 102 is attached to the vehicle 104, preferably by permanent mounting, preferably by mechanical and/or adhesive attachment, and is preferably mounted adjacent a usual vehicle component (such as, for example, a vehicle body part, panel and/or accessory, including interior components) such as are described below and shown (see FIG. 8).

Preferably, a projector 102 is placed as part of the rear brake light assembly 122 of FIG. 2 (also see FIG. 7) to project onto the rear portion 120 of a vehicle 104 such as, for example, the trunk 112, as shown. Alternatively, the projector 102 is preferably placed under or as part of a wing assembly 178 (also see FIG. 8) to project a decorative design 106 along the rear portion 120 of a vehicle 104, as shown. Upon reading the teachings of this specification, those with ordinary skill in the art will now understand that, under appropriate circumstances, considering such issues as economics, user preference, vehicle contours, advances in technology, etc., other projector placements, such as in headlights, wheel wells, license plates, windows, hubcaps, undercarriage, spoiler, etc., may suffice. Furthermore, upon reading the teachings of this specification, those with ordinary skill in the art will now understand that, under appropriate circumstances, considering such issues as economics, user preference, vehicle contours, desired projected design, advances in technology, etc., other mounting arrangements, such as extendable/retractable projector mountings, articulated mounts, pop-out panels, etc., may suffice.

Still further, upon reading the teachings of this specification, those with ordinary skill in the art will now understand that, under appropriate circumstances, considering such issues as economics, user preference, method of travel, advances in technology, etc., the projection system may comprise other vehicles and methods of transportation, such as boats, trucks, airplanes, trains, bicycles, equine (for parades, for example), baby-buggies, motorcycles, pedestrians, etc.

Figure 3:
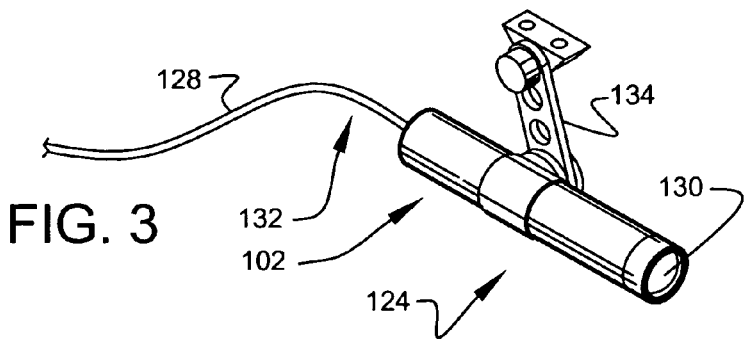
FIG. 3 shows a perspective view of a laser projector according to a preferred embodiment of the present invention.

FIG. 3 shows a perspective view of a laser projector 124 according to a preferred embodiment of the present invention. Preferably, the projector 102 comprises a laser projector 124, preferably a programmable laser projector, such as that disclosed in U.S. Pat. No. 6,655,597 incorporated herein as a reference. Upon reading the teachings of this specification, those with ordinary skill in the art will now understand that, under appropriate circumstances, considering such issues as economics, user preference, technological advances, etc., other styles of laser projector and other projectors, such as LED, fiber optic, liquid crystal display projectors, laser-show projectors, etc., may suffice.

Preferably, the laser projector 124 utilizes a twelve-volt power system and is connected to the vehicle's power supply by a power coupler such as, for example, wiring 128 (at least embodying herein power coupler means for coupling power with such light projector means; and at least embodying herein at least one power coupler adapted to couple power with such at least one light projector) that preferably couples a vehicle power source (such as the vehicle battery) to the projector 102. The techniques of powering vehicle accessories are within the abilities of those of skill in the art of installing vehicle upgrades.

Upon reading the teachings of this specification, those with ordinary skill in the art will now understand that, under appropriate circumstances, considering such issues as economics, user preference, advances in technology, etc., other power connecting means, such as connection to independent power means, connection through a separate power supply, transformed power, batteries, etc., may suffice.

Preferably, the laser projector 124 comprises a projecting lens 130 that assists in the projection of at least one design 106, (image, picture, indicia, etc.) onto another portion of the vehicle body 126, as shown (at least embodying herein wherein such light projector means comprises laser light means for projecting at least one laser decorative light design; and at least embodying herein wherein such at least one light projector comprises at least one laser light to project at least one laser decorative light design). Preferably, the laser projector 124 comprises a connection means 132, preferably a wire 128, to assist power and/or data transmission to the laser projector 124, as shown. Upon reading the teachings of this specification, those with ordinary skill in the art will now understand that, under appropriate circumstances, considering such issues as economics, user preference, material availability, advances in technology, etc., other connection means, such as wireless transmission, contact plates, etc., may suffice.

Preferably, the laser projector 124 is sized appropriately to be fitted into portions of a vehicle body 126, such as those mentioned above, however, in some preferred installations, the laser projector 124 is externally mounted using an adjustable surface mounting bracket (at least embodying herein geometric positioning means), as shown.

Figure 4:
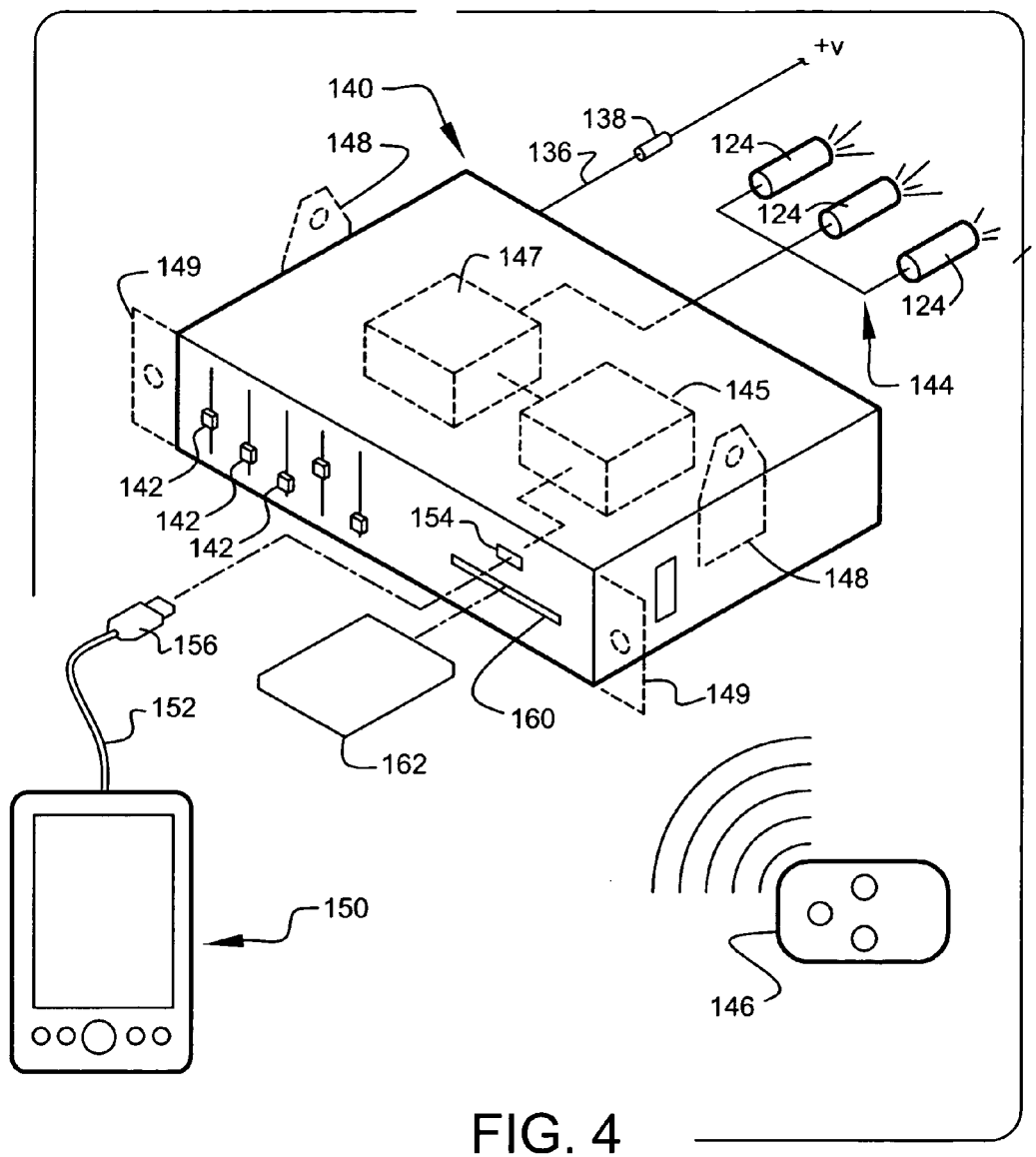
FIG. 4 shows a perspective view of a controller of the projector system according to a preferred embodiment of the present invention.

FIG. 4 shows a perspective view of a controller 140 of the projector system 100 according to a preferred embodiment of the present invention. Preferably, the laser projector 124 is connected to controller 140 that controls the projector 124 (at least embodying herein controller means for controlling such light projector means; and at least embodying herein at least one controller structured and arranged to control such at least one light projector). Preferably, controller 140 assists a user in selecting and projecting a projected design 106 with laser projector 124 (at least embodying herein user-selector means for assisting at least one user-selection of the at least one projectable decorative light design; and at least embodying herein at least one user-selector structured and arranged to assist at least one user-selection of the at least one decorative light design to be projected). Most preferably, the controller 140 provides control of such decorative design 106 characteristics as, for example, color, frequency, placement, indicia, pattern, image, rate of change, etc. Further, the controller 140 preferably comprises multiple controls 142 for controlling more than one laser projector 124 and more than one decorative design 106 characteristic. Upon reading the teachings of this specification, those with ordinary skill in the art will now understand that, under appropriate circumstances, considering such issues as economics, user preference, advances in technology, etc., other combinations of controls, such as more or fewer than one laser projector control, more or fewer image characteristic controls, flashers, on/off controls, etc., may suffice.

Even further, the controller 140 preferably provides a power coupler 136, which preferably couples controller 140 to the main power supply of the vehicle 104 (or other chosen power source), which is most preferably a twelve-volt power supply of the sort presently used in vehicle electrical systems. Preferably, the power coupler 136 comprises a fuse 138, as shown. Those knowledgeable in such fuse art will easily determine the proper fuse 138 requirements.

Preferably, the controller 140 is mounted near the operator of the vehicle 104, so that the operator may easily manipulate the controller 140 from the driver's seat. Preferably, controller 140 comprises a mount such as, for example, mounting brackets 148 to assist such mounting under the vehicle dash, or mounting brackets 149 to assist such mounting within the vehicle dash. Upon reading the teachings of this specification, those with ordinary skill in the art will now understand that, under appropriate circumstances, considering such issues as economics, user preference, theft control, advances in technology, etc., other mounting locations for the controller, such as beneath a vehicle seat, a trunk mount, a removable controller, etc., may suffice.

Preferably, the controller 140 comprises a wiring coupler/harness 144 adapted to connect the laser projectors 124 to the controller 140, as shown, permitting data and/or power communication between the controller 140 and the laser projectors 102. The above arrangement at least embodies herein wherein such controller means is electronically coupled to such light projector means and wherein such controller means comprises such user-selector means; and further at least embodies herein wherein such at least one controller is electronically coupled to such at least one light projector and wherein such at least one controller comprises such at least one user-selector. Upon reading the teachings of this specification, those with ordinary skill in the art will now understand that, under appropriate circumstances, considering such issues as economics, user preference, laser projector locations, advances in technology, etc., other coupler arrangements, such as wireless coupling, etc., may suffice.

Preferably, the controller 140 comprises a remote control 146, as shown, which preferably allows the user to access one or more of the functions of controller 140 from a remote location. Preferably, the controller 140 comprises electronic storage 145, as shown, which is preferably an electronic data storage device adapted to electronically store one or more decorative light designs 106. Preferably, the electronic storage 145 is programmed from a portable computer 150, most preferably about the size of a PDA (personal digital assistant), as shown. This arrangement at least embodies herein wherein such at least one user-selector comprises at least one decorative light design storage adapted to store the at least one decorative light design. Preferably, the portable computer 150 and the controller 140 comprise a communication coupling 152, preferably a USB-style port 154 and USB-style plug 156, to transfer laser projector programming information, as shown. Upon reading the teachings of this specification, those with ordinary skill in the art will now understand that, under appropriate circumstances, considering such issues as economics, user preference, technology advances in data transfer, etc., other communication transfer couplings, such as "Wi-Fi", wireless, phone, RS232 serial, etc., may suffice.

Preferably, the controller 140 comprises a data media reader 160 to read and download data from a data-storage device 162, as shown. Preferably, the data-storage device 162 is another data source to transfer laser projector programming information to the controller 140, as shown. Preferably, a multitude of laser projector programming information can now be processed by retriever 147 from the storage 145 and can be sent to the projector 102 to be projected onto the vehicle body 126. Preferably, laser projector programming information comprises electronic data adapted to instruct laser projectors 102 to project decorative light designs 106. This arrangement embodies herein wherein such at least one decorative light design storage comprises: at least one programmer adapted to program the at least one decorative light design into such at least one storage; and at least one retriever adapted to retrieve the at least one decorative light design from such at least one storage; wherein the at least one decorative light design can be programmed, stored, retrieved and projected by such light projection system.

FIG. 1 and FIG. 2 illustrate that the projectors 102 may be placed in one or multiple locations as shown above including: above the interior rear-view mirror 170, in the fender 172, grill 174, exterior rear-view mirror 176, rear brake light assembly 122, rear wing assembly 178, bumper 192, etc., as shown (at least embodying herein wherein such vehicle comprises at least one usual vehicle component modified to house such at least one light projector).

It is also noted that most preferably the controller 140 may be manually operated, computer programmed, remote controlled or utilize pre-selected programming to control the projection of the decorative designs 106 onto the vehicle exterior. Upon reading the teachings of this specification, those with ordinary skill in the art will now understand that, under appropriate circumstances, considering such issues as economics, user preference, electronic components, advances in technology, etc., other controller functions may suffice.

Figure 5:
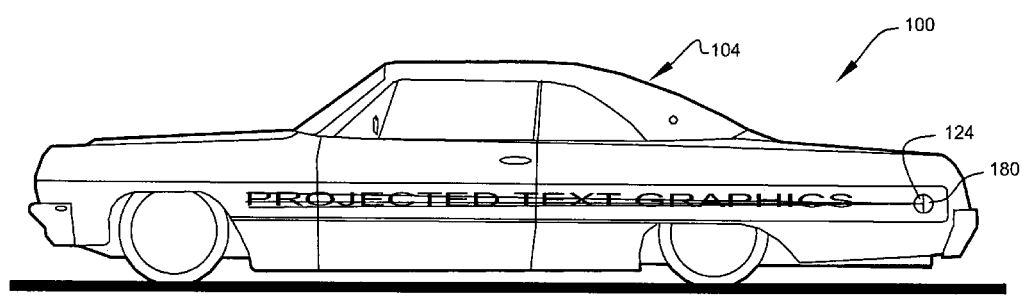
FIG. 5 shows a side view of a laser projector installed adjacent a gas access panel of a vehicle according to another preferred embodiment of the present invention.
Figure 6:
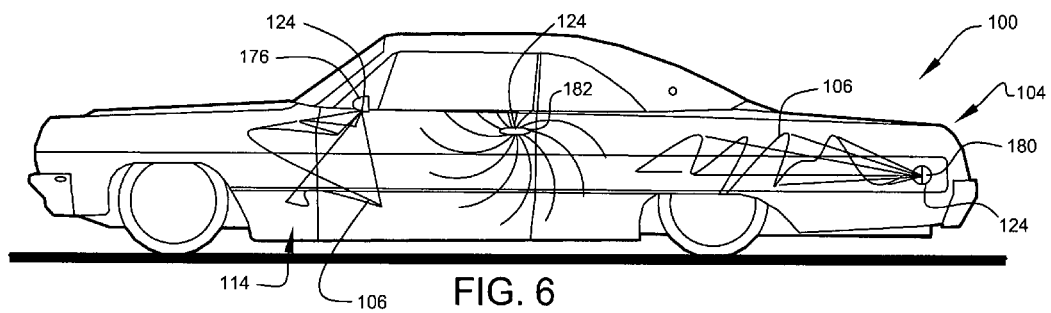
FIG. 6 shows a side view of additional laser projectors installed on a vehicle according to another preferred embodiment of the present invention.

FIG. 5 shows a side view of the projection system 100 illustrating a laser projector 124 installed adjacent a gas access panel 180 of a vehicle 104 according to another preferred embodiment of the present invention. FIG. 6 shows a side view of the projection system 100 illustrating additional laser projectors 124 installed on a vehicle 104 according to another preferred embodiment of the present invention. Preferably, the laser projectors 124 may be installed in exterior accessories of the vehicle 104, such as: an exterior rear-view mirror 176, adjacent a door handle 182, and/or adjacent a gas access panel 180 of vehicle 104. In the preferred embodiment of FIG. 6, the laser projector 124 installed in the exterior rear-view mirror 176 projects a design along the side 114 of the vehicle 104, as shown (at least embodying herein wherein such light projector means is operable to project the at least one user-selected decorative light design; and at least embodying herein wherein such at least one light projector is operable to project the at least one user-selected decorative light design). Preferably, the laser projector 124 installed adjacent the door handle 182 projects circumferentially along the side 114 of the vehicle 104, as shown. Preferably, the laser projector 124 installed adjacent the gas access panel 180 of vehicle 104 projects along the side 114 of the vehicle, as shown. Upon reading the teachings of this specification, those with ordinary skill in the art will now understand that, under appropriate circumstances, considering such issues as economics, user preference, design choice, vehicle style, advances in technology, etc., other decorative design arrangements may suffice.

Figure 7:
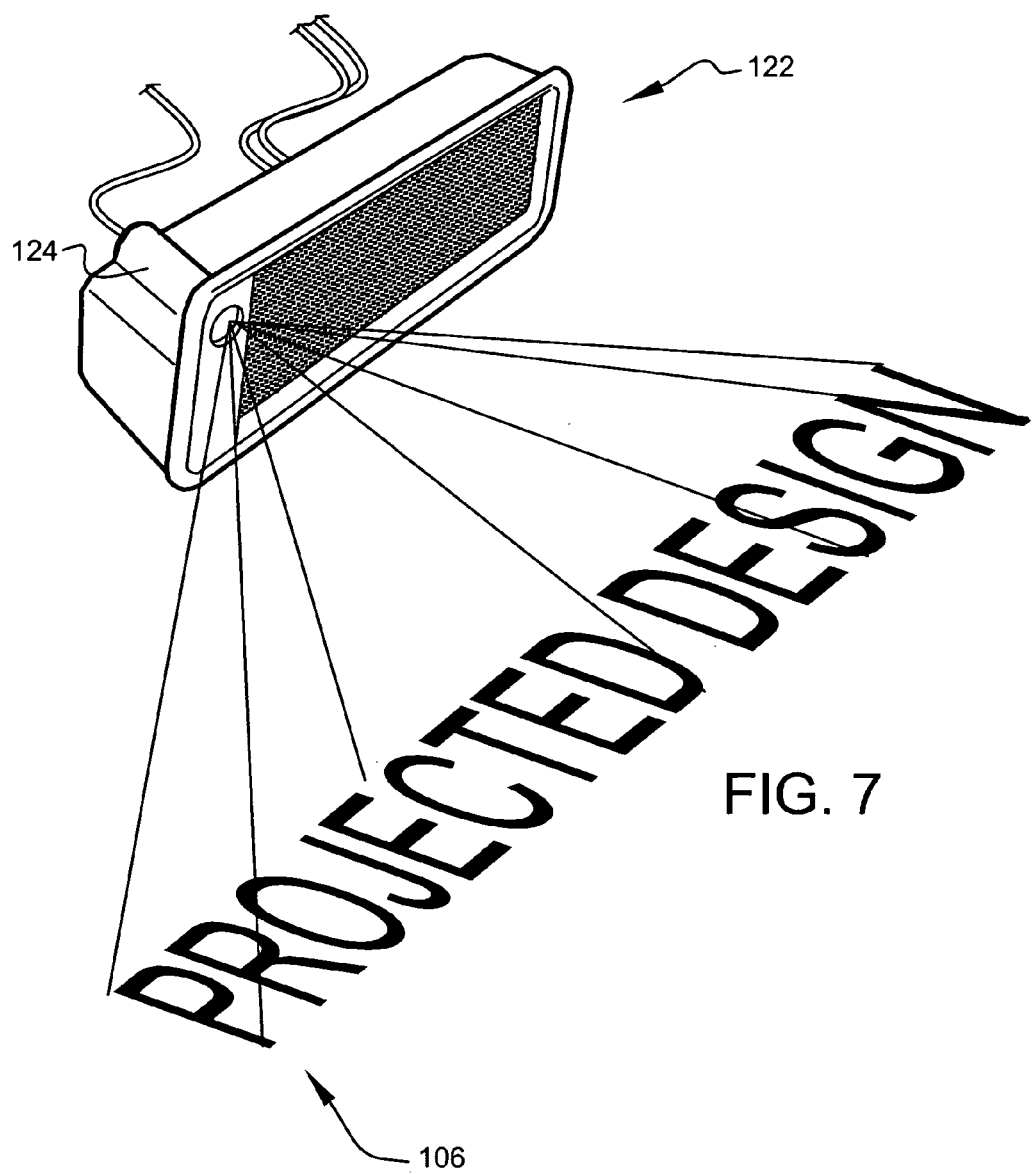
FIG. 7 shows a perspective view of a laser projector installed in a rear brake light assembly according to another preferred embodiment of the present invention.

FIG. 7 shows a perspective view of a laser projector 124 installed in a rear brake light assembly 122 according to another preferred embodiment of the present invention. In another preferred embodiment of the laser projection system 100, a laser projector 124 is installed as part of the rear brake light assembly 122, as shown. Preferably, the laser projector 124 projects a design 106, as shown. Upon reading the teachings of this specification, those with ordinary skill in the art will now understand that, under appropriate circumstances, considering such issues as economics, user preference, vehicle style, design projection preference, advances in technology, etc., other arrangements for mounting a laser projector in the rear brake light assembly, such as a swivel projector, multiple projectors, etc., may suffice.

Figure 8:
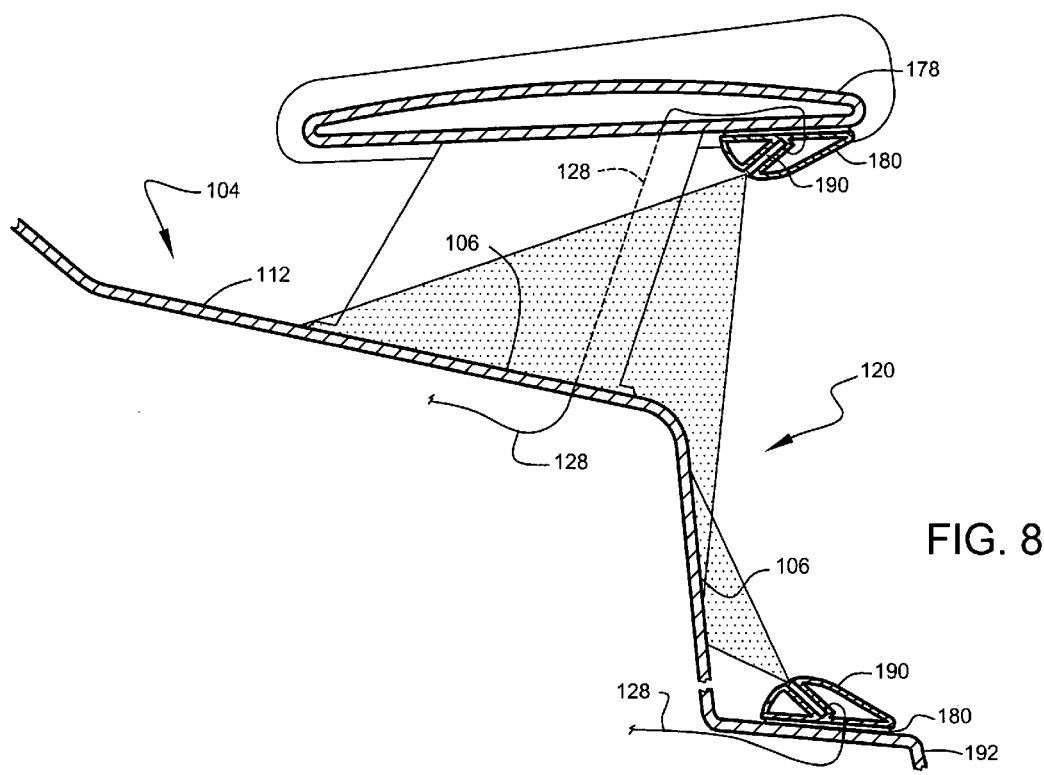
FIG. 8 shows a section view through section 8—8 of FIG. 3.

FIG. 8 shows a section view through section 8—8 of FIG. 2. In another preferred embodiment of the laser projection system 100, a laser projector 190 is installed adjacent the rear wing assembly 178, as shown. Preferably, the laser projector 190 is attached to the rear wing assembly 178 and projects a design onto the trunk 112 or other rear portion 120 of the vehicle 104, as shown. Preferably, a laser projector 190 may also be installed adjacent the bumper 192 of vehicle 104 to project a design 106 along another rear portion 120 of the vehicle 104, as shown. Preferably, the attachment 180 is a permanent adhesive that will adhere to the vehicle 104, as shown. The above arrangement embodies herein attacher means for attaching such light projector means with the vehicle; and embodies herein at least one attacher adapted to attach such at least one light projector with the vehicle. Upon reading the teachings of this specification, those with ordinary skill in the art will now understand that, under appropriate circumstances, considering such issues as economics, user preference, advances in technology, etc., other attachments to attach the projector to the vehicle, such as brackets, screws, articulated mounts, etc., may suffice.

Upon reading the teachings of this specification, those with ordinary skill in the art will now understand that, under appropriate circumstances, considering such issues as economics, user preference, design preference, advances in technology, etc., other locations for projecting the decorative design, such as projecting a design along the ground, other vehicle locations, in the air (as a beacon, etc.), into a vehicle-generated smokescreen, etc., may suffice.

Preferably, in operation, one or more projectors 102 are placed within the vehicle body 126. Preferably, the projectors 102 are attached and geometrically positioned on or adjacent a vehicle component to be projectable onto a selected exterior portion of the vehicle, as shown. Preferably, the projectors 102 are and coupled to a power source, most preferably connected to the controller 140. It is noted that the projectors 102 may be battery powered and have as little as one design that can be projected until the battery power is exhausted or the projector is turned off. Most preferably, the controller 140 is mounted under the dash of the vehicle or as otherwise preferred as described above. Preferably, the user enters projector 102 programming information into the controller 140 either by data media 162, portable computer 150 or as otherwise described herein. Preferably, the user then turns on the projectors 102 and the chosen designs are displayed on the vehicle 104 or otherwise chosen locations. Preferably, the user can adjust or change the designs as desired using controller 140. This arrangement embodies herein a vehicle projection system relating to use of a light projecting system comprising at least one light projector adapted to project at least one decorative light design onto at least one exterior portion of the vehicle, at least one attacher adapted to attach such at least one light projector with the vehicle, at least one power coupler adapted to couple power with such at least one light projector, and at least one geometric positioner adapted to assist geometric positioning of such at least one light projector so that the at least one decorative light design is projectable onto the at least one exterior portion of the vehicle, such vehicle projection system comprising the steps of: selecting such at least one light projector; attaching and geometrically positioning such at least one light projector to such vehicle; electronically coupling such at least one light projector to a power source; and projecting such at least one decorative light design onto such at least one exterior portion of such vehicle.

Upon reading the teachings of this specification, those with ordinary skill in the art will now understand that, under appropriate circumstances, considering such issues as economics, user preference, durability, weather conditions, advances in technology, etc., other operative methods and uses of the projector system, such as advertising, location beacons, emergency locators, emergency flashers, entertainment purposes, music/light show combinations, corporate vehicle identity, Government vehicle identifiers, police car lighting, emergency vehicle lighting, etc., may suffice.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A light projection system, relating to use on at least one vehicle, comprising:
    a) light projector means for projecting at least one decorative light design onto at least one exterior portion of such at least one vehicle;
    b) attacher means for attaching said light projector means with such at least one vehicle;
    c) power coupler means for coupling power with said light projector means; and
    d) geometric positioner means for assisting geometric positioning of said light projector means so that such at least one decorative light design is projectable onto such at least one exterior portion of such at least one vehicle.

2. The light projection system, according to claim 1, further comprising user-selector means for assisting at least one user-selection of such at least one projectable decorative light design.

3. The light projection system, according to claim 2, wherein said light projector means is operable to project such at least one user-selected decorative light design.

4. The light projection system, according to claim 1, wherein said light projector means comprises laser light means for projecting such at least one decorative light design.

5. The light projection, system according to claim 1, further comprising controller means for controlling said light projector means.

6. The light projection system, according to claim 5, wherein:
    a) said controller means is electronically coupled to said light projector means; and
    b) said controller means comprises said user-selector means.

7. A light projection system, relating to use on at least one vehicle, comprising:
    a) at least one light projector adapted to project at least one decorative light design onto at least one exterior portion of such at least one vehicle;
    b) at least one attacher adapted to attach said at least one light projector with such at least one vehicle;
    c) at least one power coupler adapted to couple power with said at least one light projector; and
    d) at least one geometric positioner adapted to assist geometric positioning of said at least one light projector so that such at least one decorative light design is projectable onto such at least one exterior portion of such at least one vehicle.

8. The light projection system, according to claim 7, wherein said at least one light projector comprises at least one laser light to project such at least one decorative light design.

9. The light projection system, according to claim 7, further comprising such at least one vehicle.

10. The light projection system, according to claim 9, wherein said at least one vehicle comprises at least one usual vehicle component modified to house said at least one light projector.

11. The light projection system, according to claim 7, further comprising at least one user-selector structured and arranged to assist at least one user-selection of such at least one decorative light design to be projected.

12. The light projection system, according to claim 11, wherein said at least one light projector is operable to project such at least one user-selected decorative light design.

13. The light projection system, according to claim 11, wherein said at least one user-selector comprises at least one decorative light design storage adapted to store such at least one decorative light design.

14. The light projection system, according to claim 13, wherein said at least one decorative light design storage comprises:
   a) at least one program-assister adapted to assist programming of such at least one decorative light design into said at least one storage; and
   b) at least one retriever adapted to retrieve such at least one decorative light design from said at least one storage;
   c) wherein said light projection system is operable to program, store, retrieve and project such at least one decorative light design.

15. The light projection system, according to claim 11, further comprising at least one controller structured and arranged to control said at least one light projector.

16. The light projection system, according to claim 15, wherein:
   a) said at least one controller is electronically coupled to said at least one light projector; and
   b) said at least one controller comprises said at least one user-selector.

17. A light projection system, relating to use on at least one vehicle, comprising, in combination:
   a) at least one such vehicle;
   b) at least one light projector adapted to project at least one decorative light design onto at least one exterior portion of such at least one vehicle;
   c) at least one attacher adapted to attach said at least one light projector with such at least one vehicle;
   d) at least one power coupler adapted to couple power with said at least one light projector;
   e) at least one geometric positioner adapted to assist geometric positioning of said at least one light projector so that such at least one decorative light design is projectable onto such at least one exterior portion of such at least one vehicle; and
   f) at least one controller structured and arranged to control said at least one light projector;
   g) wherein said at least one controller comprises at least one user-selector structured and arranged to assist at least one user-selection of such at least one decorative light design to be projected;
   h) wherein said at least one user-selector comprises at least one decorative light design storage adapted to store such at least one decorative light design;
   i) wherein said at least one decorative light design storage comprises
      (1) at least one program-assister adapted to assist programming such at least one decorative light design into said at least one storage; and
      (2) at least one retriever adapted to retrieve such at least one decorative light design from said at least one storage; and
   j) wherein said light projection system is operable to program, store, retrieve and project such at least one decorative light design.

18. A method of installing at least one vehicle projection system relating to use of a light projecting system comprising at least one light projector adapted to project at least one decorative light design onto at least one exterior portion of such at least one vehicle, at least one attacher adapted to attach such at least one light projector with such at least one vehicle, at least one power coupler adapted to couple power with such at least one light projector, and at least one geometric positioner adapted to assist geometric positioning of such at least one light projector so that such at least one decorative light design is projectable onto such at least one exterior portion of such at least one vehicle, such method of installing at least one vehicle projection system comprising the steps of:
   a) selecting such at least one light projector;
   b) attaching and geometrically positioning such at least one light projector to such at least one vehicle;
   c) electronically coupling such at least one light projector to at least one power source; and
   d) projecting such at least one decorative light design onto such at least one exterior portion of such at least one vehicle.

19. The method of installing at least one vehicle projection system, according to claim 18, further comprising the step of modifying at least one existing vehicle component to house such at least one light projector.

* * * * *